US008386501B2

(12) United States Patent
Cahill et al.

(10) Patent No.: US 8,386,501 B2
(45) Date of Patent: Feb. 26, 2013

(54) DYNAMICALLY SPLITTING MULTI-TENANT DATABASES

(75) Inventors: Jason Cahill, Woodinville, WA (US); Alexander Hopmann, Seattle, WA (US); Eric Fox, Seattle, WA (US); Balinder Malhi, Redmond, WA (US); Zach Rosenfield, Seattle, WA (US); Marc Keith Windle, Woodinville, WA (US); Patrick Simek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/908,639

(22) Filed: Oct. 20, 2010

(65) Prior Publication Data

US 2012/0102067 A1    Apr. 26, 2012

(51) Int. Cl.
*G06F 17/30* (2006.01)
(52) U.S. Cl. ....................................................... 707/756
(58) Field of Classification Search .................. 707/200, 707/655, 756; 709/225
See application file for complete search history.

(56) References Cited

U.S. PATENT DOCUMENTS

| | | | |
|---|---|---|---|
| 5,553,215 A | 9/1996 | Kaethler | 715/219 |
| 5,835,910 A | 11/1998 | Kavanagh et al. | 1/1 |
| 5,913,032 A | 6/1999 | Schwartz et al. | 709/213 |
| 6,212,382 B1 * | 4/2001 | Watson et al. | 455/444 |
| 6,571,283 B1 | 5/2003 | Smorodinsky | 709/220 |
| 6,578,054 B1 | 6/2003 | Hopmann et al. | 707/625 |
| 6,675,226 B1 | 1/2004 | Nair et al. | |
| 6,711,593 B1 | 3/2004 | Gordon et al. | 707/615 |
| 6,823,384 B1 * | 11/2004 | Wilson et al. | 709/225 |
| 6,898,727 B1 | 5/2005 | Wang et al. | |
| 6,983,311 B1 | 1/2006 | Haitsuka et al. | |
| 6,988,241 B1 | 1/2006 | Guttman et al. | |
| 7,000,228 B2 | 2/2006 | Mortazavi | 717/168 |
| 7,325,156 B1 | 1/2008 | Schloss et al. | |
| 7,360,208 B2 | 4/2008 | Joshi et al. | 717/168 |
| 7,454,659 B1 | 11/2008 | Gaudette et al. | |
| 7,555,751 B1 | 6/2009 | Abbavaram et al. | 717/168 |
| 7,577,661 B2 | 8/2009 | Bankston et al. | 1/1 |
| 7,668,961 B2 | 2/2010 | Lomet | 709/230 |
| 7,680,848 B2 | 3/2010 | Janeditakarn | |
| 7,680,933 B2 | 3/2010 | Fatula, Jr. | 709/226 |
| 7,720,820 B2 | 5/2010 | Lomet | 707/682 |
| 8,185,897 B2 | 5/2012 | Kushwaha | |
| 8,296,267 B2 | 10/2012 | Cahill et al. | |

(Continued)

FOREIGN PATENT DOCUMENTS

| | | |
|---|---|---|
| KR | 10-0980599 | 9/2010 |
| WO | 2010-090899 | 8/2010 |

OTHER PUBLICATIONS

Meng et al., "Improving the Scalability of Data Center Networks with Traffic-aware Virtual Machine Placement"; IBM T. J. Watson Research Center; Published May 6, 2010; 9 pgs.

(Continued)

*Primary Examiner* — Etienne LeRoux
(74) *Attorney, Agent, or Firm* — Merchant & Gould

(57) ABSTRACT

An online service includes managed databases that include one or more tenants (e.g. customers, users). A multi-tenant database may be split between two or more databases while the database being split continues processing requests. For example, web servers continue to request operations on the database while content is being moved. After moving the content, tenant traffic is automatically redirected to the database that contains the tenant's content.

20 Claims, 7 Drawing Sheets

U.S. PATENT DOCUMENTS

| | | | | |
|---|---|---|---|---|
| 2001/0056554 | A1 | 12/2001 | Chrabaszcz | 714/13 |
| 2002/0078233 | A1 | 6/2002 | Biliris et al. | 709/238 |
| 2002/0161814 | A1 | 10/2002 | Wical | |
| 2002/0162049 | A1 | 10/2002 | Takamoto et al. | |
| 2003/0005133 | A1 | 1/2003 | Banerjee et al. | |
| 2003/0061365 | A1 | 3/2003 | White et al. | 709/229 |
| 2003/0193558 | A1 | 10/2003 | Doss et al. | 348/14.01 |
| 2003/0204460 | A1 | 10/2003 | Robinson et al. | |
| 2004/0133619 | A1 | 7/2004 | Zelig et al. | 709/200 |
| 2004/0143662 | A1 | 7/2004 | Poyhonen | |
| 2004/0205765 | A1 | 10/2004 | Beringer et al. | |
| 2004/0210623 | A1 | 10/2004 | Hydrie et al. | 709/223 |
| 2005/0050076 | A1 | 3/2005 | Tong et al. | 707/100 |
| 2005/0132382 | A1 | 6/2005 | McGuire et al. | |
| 2006/0015932 | A1 | 1/2006 | Ballinger et al. | 726/9 |
| 2006/0031268 | A1 | 2/2006 | Shutt et al. | |
| 2006/0070020 | A1 | 3/2006 | Puttaswamy et al. | |
| 2006/0075076 | A1 | 4/2006 | Sinha | |
| 2006/0085785 | A1 | 4/2006 | Garrett | 718/1 |
| 2006/0123119 | A1 | 6/2006 | Hill et al. | 709/227 |
| 2006/0168218 | A1 | 7/2006 | Kashyap | 709/225 |
| 2006/0190698 | A1 | 8/2006 | Mizuno et al. | 711/170 |
| 2006/0271395 | A1 | 11/2006 | Harris et al. | 718/1 |
| 2006/0277224 | A1 | 12/2006 | Aftab et al. | 707/201 |
| 2007/0005769 | A1 | 1/2007 | Ammerlann et al. | 709/226 |
| 2007/0050415 | A1* | 3/2007 | Armangau et al. | 707/200 |
| 2007/0086476 | A1 | 4/2007 | Iglesias et al. | |
| 2007/0130566 | A1 | 6/2007 | van Rietschote et al. | 718/1 |
| 2007/0169187 | A1 | 7/2007 | Crespo et al. | |
| 2007/0198554 | A1 | 8/2007 | Liu | 1/1 |
| 2007/0204325 | A1 | 8/2007 | Cameron et al. | |
| 2007/0219956 | A1 | 9/2007 | Milton | 1/1 |
| 2007/0220415 | A1 | 9/2007 | Cheng et al. | |
| 2007/0260644 | A1 | 11/2007 | Ljungqvist et al. | |
| 2007/0261049 | A1* | 11/2007 | Bankston et al. | 717/170 |
| 2007/0271560 | A1 | 11/2007 | Wahlert et al. | |
| 2008/0077632 | A1 | 3/2008 | Tysowski et al. | |
| 2008/0082560 | A1 | 4/2008 | Agrawal et al. | 707/101 |
| 2008/0098046 | A1 | 4/2008 | Alpern et al. | 1/1 |
| 2008/0120351 | A1 | 5/2008 | Khaladkar et al. | |
| 2008/0126428 | A1 | 5/2008 | Swanburg | |
| 2008/0147753 | A1 | 6/2008 | Chasman et al. | 1/1 |
| 2008/0154918 | A1 | 6/2008 | Iwatsu et al. | |
| 2008/0155023 | A1 | 6/2008 | Kadashevich | |
| 2008/0189468 | A1 | 8/2008 | Schmidt et al. | 711/6 |
| 2008/0243867 | A1 | 10/2008 | Janedittakarn et al. | 1/1 |
| 2008/0244184 | A1 | 10/2008 | Lewis et al. | 711/130 |
| 2008/0270459 | A1 | 10/2008 | Grewal et al. | 1/1 |
| 2008/0270564 | A1 | 10/2008 | Rangegowda et al. | 709/212 |
| 2009/0083561 | A1* | 3/2009 | Kaburlasos et al. | 713/323 |
| 2009/0164621 | A1 | 6/2009 | Kothari et al. | 709/224 |
| 2009/0216789 | A1 | 8/2009 | Chowdharty et al. | 707/101 |
| 2009/0216855 | A1 | 8/2009 | Lang et al. | |
| 2009/0228950 | A1 | 9/2009 | Reed et al. | 726/1 |
| 2009/0248756 | A1 | 10/2009 | Akidau et al. | |
| 2009/0293022 | A1 | 11/2009 | Fries | 716/132 |
| 2009/0293056 | A1 | 11/2009 | Ferris | |
| 2009/0327139 | A1 | 12/2009 | Shah et al. | 705/71 |
| 2010/0011409 | A1 | 1/2010 | Hodgkinson et al. | 726/1 |
| 2010/0070466 | A1 | 3/2010 | Prahlad et al. | |
| 2010/0082860 | A1 | 4/2010 | Murthy | |
| 2010/0095198 | A1 | 4/2010 | Bultrowicz et al. | |
| 2010/0106812 | A1 | 4/2010 | Bernabeu-Auban et al. | 709/221 |
| 2010/0113159 | A1 | 5/2010 | Chapman et al. | |
| 2010/0121902 | A1 | 5/2010 | Chandrasekhar et al. | |
| 2010/0125612 | A1 | 5/2010 | Amradkar et al. | 707/802 |
| 2010/0145861 | A1 | 6/2010 | Law et al. | |
| 2010/0146290 | A1 | 6/2010 | Bachmann et al. | 713/185 |
| 2010/0162226 | A1 | 6/2010 | Borissov | 717/173 |
| 2010/0192143 | A1 | 7/2010 | Ingle et al. | 717/172 |
| 2010/0205227 | A1 | 8/2010 | Weissman et al. | |
| 2010/0211548 | A1* | 8/2010 | Ott et al. | 707/655 |
| 2010/0211619 | A1 | 8/2010 | Weissman et al. | |
| 2010/0251242 | A1 | 9/2010 | Sivasubramanian et al. | |
| 2010/0251339 | A1 | 9/2010 | McAlister | |
| 2010/0262632 | A1 | 10/2010 | Jain | |
| 2010/0275222 | A1 | 10/2010 | Wallace | |
| 2010/0287359 | A1* | 11/2010 | Norden | 712/210 |
| 2010/0312810 | A1 | 12/2010 | Horton et al. | |
| 2011/0161964 | A1 | 6/2011 | Piazza et al. | |
| 2012/0101983 | A1 | 4/2012 | Hopmann et al. | |
| 2012/0101998 | A1 | 4/2012 | Cahill et al. | |
| 2012/0102198 | A1 | 4/2012 | Cahill et al. | |
| 2012/0102199 | A1 | 4/2012 | Hopmann et al. | |
| 2012/0102480 | A1 | 4/2012 | Hopmann et al. | |
| 2012/0102494 | A1 | 4/2012 | Cahill et al. | |
| 2012/0102506 | A1 | 4/2012 | Hopmann et al. | |
| 2012/0131660 | A1 | 5/2012 | Dalzell et al. | |
| 2012/0151378 | A1 | 6/2012 | Parish et al. | |

OTHER PUBLICATIONS

U.S. Appl. No. 12/908,681, filed Oct. 20, 2010 entitled "Placing Objects on Hosts Using Hard and Soft Constraints."

U.S. Appl. No. 12/908,623, filed Oct. 20, 2010 entitled "High Availability of Machines During Patching."

U.S. Appl. No. 12/908,653, filed Oct. 20, 2010 entitled "Web Service Patterns for Globally Distributed Service Fabric."

U.S. Appl. No. 12/908,590, filed Oct. 20, 2010 entitled "Machine Manager Service Fabric."

U.S. Appl. No. 12/908,703, filed Oct. 20, 2010 entitled "Online Database Availability During Upgrade."

U.S. Appl. No. 12/908,752, filed Oct. 20, 2010 entitled "Upgrade of Highly Available Farm Server Groups."

U.S. Appl. No. 12/908,694, filed Oct. 20, 2010 entitled "Managing Networks and Machines for an Online Service."

U.S. Appl. No. 12/953,379, filed Nov. 23, 2010 entitled "Using Cached Security Tokens in an Online Service."

U.S. Appl. No. 12/964,633, filed Dec. 9, 2010 entitled "Codeless Sharing of Spreadsheet Objects."

Above the Cloud; "The Azure Fabric Controller"; Published Mar. 23, 2009; http://azure.snagy.name/blog/?p=89; 3 pgs.

"Adopting Server Virtualization for Business Continuity and Disaster Recovery"; CA ARCserve Backup and CA Xosoft Replication and High Availability Software with Hyper-V Technology—A Powerful Combination; Published 2009; 17 pgs.

Allamaraju; "Idempotency Explained"; Published Feb. 21, 2008; 5 pgs.

"BadBlue Excel Web Spreadsheet Collaboration Server 2.72b"; Published Apr. 20, 2010; http://badblue-excel-web-spreadsheet-collaboration-server.badblue.qarchive.org/; 2 pgs.

Chaisiri et al., "Optimal Virtual Machine Placement across Multiple Cloud Providers"; School of Computer Engineering, Nanyang Technological University, Singapore; 2009 IEEE; 8 pgs.

Chronic db; "Live Database Schema Updates—Zero Downtime"; Retrieved Sep. 20, 2010; http://chronicdb.com/benefits_of_chronicdb; 3 pgs.

Crets; "Idempotent Services"; Blog of Guy Crets; Jul. 9, 2008; 1 pg.

Das et al., "ElasTraS: An Elastic, Scalable, and Self Managing Transactional Database for the Cloud"; Department of Computer Science, University of California, Santa Barbara, CA; UCSB Computer Science Technical Report Apr. 2010; 14 pgs.

"Excel Services Overview (SharePoint Server 2010)"; Microsoft Corporation; Published May 12, 2010; http://technet.microsoft.com/en-us/library/ee424405.aspx; 3 pgs.

Exortech; "Zero-Downtime Database Deployment"; Published Feb. 1, 2009; http://exortech.com/blog/2009/02/01weekly-release-blog-11-zero-downtime-database-deployment; 3 pgs.

Forster et al.; "Using SAML Security Tokens with Microsoft Web Services Enhancements"; Published Apr. 29, 2008; http://www.ibm.com/developerworks/tivoli/library/t-samlwse/index.html; 23 pgs.

"HP Serviceguard Cluster Configuration for HP-UX 11i or Linux Partitioned Systems"; Apr. 2009; 13 pgs.

Hyser et al., "Autonomic Virtual Machine Placement in the Data Center"; HP Laboratories; Feb. 26, 2008; 11 pgs.

"IBM Director v6.2.x"; Retrieved Sep. 20, 2010; http://publib.boulder.ibm.com/infocenter/director/v6r2x/index.jsp?topic=/com.ibm.director.updates.helps.doc/fqm0_t_um_updating_systems.html; 2 pgs.

KaChing Engineering; "No Downtime Database Schema Changes"; Published Aug. 15, 2010; http://eng.kaching.com/2010/08/no-downtime-database-schema-changes.html; 4 pgs.

Kim, "Virtual Machine Placement Optimization"; Carnegie Mellon Engineering, Carnegie Institute of Technology; Retrieved Date—Aug. 26, 2010; 2 pgs.

Kumar; "Sharing and Previewing Google Docs in Socialwok: Google Data SPI"; Published Apr. 9, 2010; http://googleappsdeveloper.blogspot.com/2010/04/sharing-and-previewing-google-docs-in.html; 6 pgs.

"LinkedCells 1.8 Description"; WareSeeker.com; Published Mar. 16, 2009; http://wareseeker.com/Business-Finance/linkedcells-1.8.zip/1f2ea4b9e; 3 pgs.

"Microsoft High Availability Overview White Paper"; Published Jan. 2008; 19 pgs.

Microsoft; "Virtual Machine Manager"; Retrieved Sep. 21, 2010; http://www.microsoft.com/systemcenter/en/us/virtual-machine-manager.aspx; 2 pgs.

Microsoft Corporation; "Scaling Out SQL Server 2005"; Published Date: Apr. 2006; http://msdn.microsoft.com/en-us/library/aa479364.aspx; 15 pgs.

Microsoft Corporation; "Messaging Patterns in Service-Oriented Architecture, Part 1"; Published Apr. 2004; 10 pgs.

Microsoft TechNet; "Placing Virtual Machines on Hosts"; 2010 Microsoft Corporation; 3 pgs.

Microsoft TechNet; "Configure a Server Farm for Minimal Downtime During Software Updates (Office SharePoint Server 2007)"; Published Sep. 17, 2009; http://technet.microsoft.com/en-us/library/ee514459(office.12).aspx; 26 pgs.

Microsoft TechNet; "Configure Claims-Based Authentication Using Windows Live ID (SharePoint Server 2010)"; Published Sep. 9, 2010; http://technet.microsoft.com/en-us/library/ff973117(printer).aspx; 17 pgs.

MSDN Magazine; "Designing Services for Windows Azure"; Published Jan. 2010; 11 pgs.

"MySQL Cluster Features"; Retrieved Sep. 20, 2010; http://www.mysql.com/products/database/cluster/features.html; 5 pgs.

"The NorduGrid Grid Manager and GridFTP Server"; Published Aug. 10, 2010; http://www.nordugrid.org/documents/GM-pdf; 37 pgs.

Oracle9i Database Migration; "Compatibility and Interoperability"; Retrieved Sep. 20, 2010; http://download.oracle.com/docs/cd/A97630_01/server.920/a96530/migcompa.htm; 42 pgs.

Ranganathan; "Idempotency in Services"; Published Dec. 1, 2009; 21 pgs.

"RightGrid Basic Example"; Retrieved Sep. 24, 2010; http://support.rightscale.com/03-Tutorials/02-AWS/03-Grid_Edition/Basic_RightGrid_Example; 16 pgs.

"SAS Grid Computing"; SAS Institute; Retrieved Sep. 24, 2010; http://www.sas.com/technologies/architecture/grid/index.html; 2 pgs.

"Small to Medium Sized Data Center with Applogic Cloud"; Migrate to Cloud; Published Jul. 22, 2010; http://www.migrate2cloud.com/blog/small-to-medium-sized-date-center-with-applogic-cloud; 4 pgs.

Tarighi et al., "A New Model for Virtual Machine Migration in Virtualized Cluster Server Based on Fuzzy Decision Making"; Journal of Telecommunications, vol. 1, Issue 1, Feb. 2010; 12 pgs.

"Understanding SharePoint 2010 Claims Authentication"; Published May 27, 2010; http://blogs.msdn.com/b/russmax/archive/2010/05/27/understanding-sharepoint-2010-claims-authentication.aspx; 5 pgs.

"Using Vmware vCenter Update Manager to Keep your vSphere Hosts Up-to-Date with Patching"; Published Feb. 9, 2010; http://www.simple-talk.com/sysadmin/virtualization/using-vmware-vcenter-update-manager-to-keep-your-vsphere-hosts-up-to-date-with-patching/; 10 pgs.

Vmware; "Automating High Availability (HA) Services with Vmware HA"; Copyright 1998-2006; 15 pgs.

Vmware vSphere; "Vmware vCenter Update Manager"; Retrieved Sep. 14, 2010; 2 pgs.

"Vmware Virtual Appliances"; Published Jan. 8, 2009; http://www.petri.co.il/virtual_vmware_virtual_appliances.htm; 2 pgs.

Wang et al., "A Study and Performance Evaluation of the Multi-Tenant Data Tier Design Patterns for Service Oriented Computing"; IBM China Research Lab, Beijing, China; IEEE Computer Society, 2008 IEEE; 8 pgs.

"XLCubed Web Edition"; Published 2009; http://xlcubed.com/en/web.html; 2 pgs.

"Zones Parallel Patching Feature Now Available"; Published Date Jun. 17, 2009; 1 pg.

International Search Report dated May 1, 2012 cited in Appln No. PCT/US2011/052175.

International Search Report dated May 3, 2012 cited in Appln No. PCT/US2011/053370.

International Search Report dated May 4, 2012 cited in Appln No. PCT/US2011/056594.

International Search Report dated May 17, 2012 cited in Appln No. PCT/US2011/054642.

International Search Report dated Jun. 15, 2012 cited in Appln No. PCT/US2011/062170.

International Search Report dated Mar. 6, 2012 cited in Appln No. PCT/US2011/054566.

International Search Report dated Mar. 6, 2012 cited in Appln No. PCT/US2011/055412.

International Search Report dated Mar. 26, 2012 cited in Appln No. PCT/US2011/053296.

International Search Report dated Apr. 25, 2012 cited in Appin No. PCT/US2011/054516.

U.S. Office Action dated Apr. 27, 2012 cited in U.S. Appl. No. 12/908,703.

U.S. Office Action dated Nov. 6, 2012 U.S. Appl. No. 12/908,694.

U.S. Office Action dated Nov. 30, 2012 U.S. Appl. No. 12/908,653.

U.S. Office Action dated Dec. 5, 2012 U.S. Appl. No. 12/953,379.

* cited by examiner

DYNAMICALLY SPLITTING MULTI-TENANT DATABASES

BACKGROUND

Web-based applications include files that are located on web servers along with data that is stored in databases. For example, there may be a large number of servers located within different networks to handle the traffic that is directed to the online service. Splitting databases in an online service may result in the service being unavailable for a period of time. For an online service, the splitting process may result in a significant disruption to the customers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A multi-tenant database may need to be split between two or more databases while the database being split continues processing requests. For example, web servers continue to request operations on the database while content is being moved. After moving the content, tenant traffic is automatically redirected to the database that contains the tenant's content.

DETAILED DESCRIPTION

Figure 1:
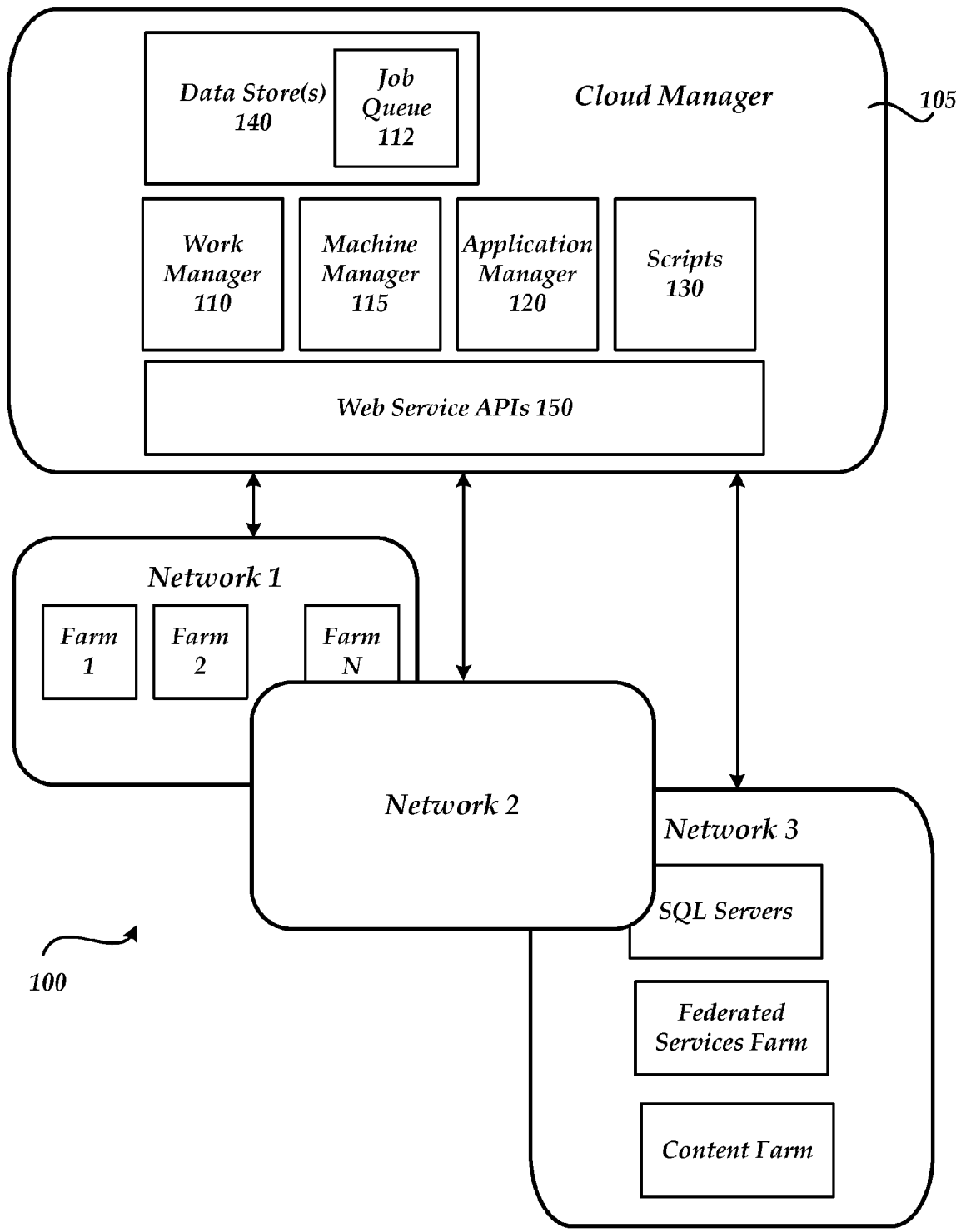
FIG. 1 illustrates a cloud manager system for managing networks that are associated with an online service, such as a content management service.

Referring now to the drawings, in which like numerals represent like elements, various embodiment will be described.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

FIG. 1 illustrates a cloud management system for managing networks that are associated with an online service. System 100 illustrates cloud manager 105 that is connected to and manages different networks potentially distributed across the world. Each of the networks is configured to provide content services for one or more tenants (e.g. clients, customers). The networks may be hosted within a cloud service and/or in an on-premises data center. Cloud manager 105 is used in deploying, configuring and managing the networks. The cloud manager is configured to receive requests through an idempotent and asynchronous application web service application programming interface (API) 150 that can tolerate intermittent network failures.

As illustrated, cloud manager 105 comprises work manager 110, machine manager 115, application specific manager 120, scripts 130 and a central repository, such as data store(s) 140 (e.g. databases). The functionality that is not included within one of the illustrated managers may reside in some other location of the cloud manager. According to one embodiment, application manager 120 is a SharePoint tenant manager that comprises SharePoint specific logic.

Work manager 110 manages the execution of tasks and enables scheduling and retry of longer running tasks. Work manager 110 starts jobs stored in job queue 112 and keeps track of running jobs. When a predetermined time has elapsed, work manager 110 may automatically cancel the task and perform some further processing relating to the task. According to one embodiment, the tasks in job queue 112 are executed by work manager 110 by invoking one or more scripts 130. For example, a scripting language such as Microsoft's PowerShell® may be used to program the tasks that are executed by work manager 110. Each script may be run as a new process. While executing each script as a new process may have a fairly high CPU overhead, this system is scalable and helps to ensure a clean environment for each script execution plus full cleanup when the script is completed.

Machine manager 115 is configured to manage the physical machines in the networks (e.g. Network 1, Network 2, Network 3). Generally, machine manager 115 understands Networks, Physical Machines, Virtual Machines (VMs), VM Images (VHDs), and the like. The machine manager does not have a strong binding to the specific services running within the networks but keeps track of the various components in the networks in terms of "roles." For example machine manager 115 could be requested through API 150 to deploy a VM of type "Foo" with version 12.34.56.78 on Network 3. In response to a request to cloud manager 105, machine manager 115 locates a suitable Physical Machine that is located on Network 3 and configures the VM according to the VM Image associated with the VM's Role. The physical machine is configured with a VHD of type Foo with version 12.34.56.78 that is stored within a data store, such as data store 140. The images used within the network may also be stored in other locations, such as a local data share for one or more of the networks. Scripts may be run to perform the installation of the VHD on the physical machine as well as for performing any post-deployment configuration. Machine manager 115 keeps track of the configuration of the machines each network. For example, machine manager 115 may keep track of a VM's role (type of VM), state of the VM (Provisioning, Running, Stopped, Failed), version and whether the VM exists in a given farm (which implies their network).

Scripts 130 is configured to store scripts that are executed to perform work both locally for cloud manager 105 and remotely on one or more of the networks. One or more of the scripts 130 may also be stored in other locations. For example, scripts to be performed on a network (e.g. Network 1, Network 2, Network 3) may be stored locally to that network. The scripts may be used for many different purposes.

For example, the scripts may be used to perform configurations of machines in one or more of the networks, changing settings on previously configured machines, add a new VM, add a new database, move data from one machine to another, move tenants, change schemas, and the like. According to one embodiment, the scripts are Microsoft's PowerShell® scripts. Other programming implementations may be used. For example, a compiled and/or early-bound programming language may be used to implement the functionality. Scripting, however, is a fairly concise language to express many of the tasks that are to be performed. Programming the equivalent in a programming language, such as C#, would often require much more verbose implementations. The scripts are also late-bound, meaning that multiple versions of underlying code-bases can be targeted without having to constantly link to different interface DLLs. Using PowerShell scripts allows a process to be started locally by cloud manager 105 that may in turn start a process on a remote machine (i.e. a physical machine in one of the attached networks). Other techniques may also be used to start a process on a remote machine, such as Secure Shell (SSH) and the like.

Application specific information that cloud manager 105 is managing is performed by application manager 120. According to one embodiment, the application specific information relates to Microsoft SharePoint®. As such, application manager 120 is configured to know about SharePoint Tenants, Site Collections, and the like.

Each network may be configured as a dedicated network for a tenant and/or as a multi-tenant network that services more than one client. The networks may include a changing number of physical/virtual machines with their configuration also changing after deployment. Generally, a network may continue to grow as long as the networking limits (e.g. load balancer and network switches) are not exceeded. For example, a network may start out with ten servers and later expand to one hundred or more servers. The physical machines within a network may be assigned a class or type. For example, some of the machines may be compute machines (used for web front ends and app servers) and other machines may be storage machines that are provisioned with more storage than compute machines. According to an embodiment, cloud manager 105 configures the machines within a network with multiple versions of the image files. According to an embodiment, farms usually have a same version of image files.

According to one embodiment, the software limits are managed by the cloud manager system 100 within the network by virtualizing the machines and managing independently acting "Farms" inside the network. Each network may include one or more farms (e.g. see Network 1). According to one embodiment, a network is considered a single cluster of network load balanced machines that expose one or more VIP (Virtual IP) to the outside world and can route that traffic to any of the machines within the network. The machines in the network generally are tightly coupled and have minimum latencies (i.e. <1 ms ping latency).

Farms are the basic grouping of machines used to coordinate applications that need tightly bound relationships. For example, content farms may be deployed within each of the networks for a content management application, such as Microsoft SharePoint®. Generally, the set of machines in each of the farms provide web service and application server functions together. Typically, the machines inside the farm are running the same build of an application (i.e. SharePoint) and are sharing a common configuration database to serve specific tenants and site collections.

Farms can contain heterogeneous sets of virtual machines. Cloud manager 105 maintains a "farm goal" within data store 140 which is a target number of machines of each role for each farm. Some roles include Content Front End, Content Central Admin, Content Timer Service, Federated Central Admin, Federated App Server etc. For example, content farms are the basic SharePoint farm that handles incoming customer requests. Federated Services farms contain SharePoint services that can operate cross farms such as search and the profile store. Farms may be used for hosting large capacity public internet sites. Some farms may contain a group of Active Directory servers and a Provisioning Daemon. Cloud manager 105 automatically deploys and/or decommissions virtual machines in the networks to help in meeting the defined target. These farms goals may be automatically and/or manually configured. For example, the farm goals may change to respond to changes in activity and capacity needs. Network Farm—there is one network farm per Network that contains all the VM roles that scale out easily as a resource to the whole Network.

The Cloud Manager Web Service APIs 150 are designed to work in the context of a massively scalable global service. The APIs assume that any network request might fail and/or hang in transit. Calls to cloud manager 105 are configured to be idempotent. In other words, the same call may be made to cloud manager 105 multiple times (as long as the parameters are identical) without changing the outcome.

Cloud manager 105 is designed to do very little processing (<10 ms, <50 ms) before returning a response to any given request. Cloud manager 105 maintains records to keep track of current requests. For example, cloud manager 105 updates records in a local database and if necessary schedules a "job" to perform more lengthy activity later.

Cloud manager keeps track of Images (such as Virtual Disk Images) that are the templates used to deploy new machines within a network. The Image references may be stored in a database, such as database 140, and/or in some other location. The images may be stored in one or more shared data stores that are local to the network(s) on which the image will be deployed. According to one embodiment, each Image includes a virtual machine (VM) role type that specifies the type of VM it can deploy, the number of processors that it should use, the amount of RAM that it will be assigned, a network ID used to find a nearby install point (so they don't get copied repeatedly over the cross data-center links) and a share path that the deployment code can use to access the VHD.

Generally, machines in the networks being managed by cloud system 100 are not upgraded in the traditional manner by downloading data and incorporating the data into the existing software on the machine. Instead, machines are updated by replacing a VHD with an updated VHD. For example, when a new version of software is needed by a farm, a new farm is deployed that has the new version installed. When the new farm is deployed, the tenants are moved from the old farm to the new farm. In this way, downtime due to an upgrade is minimized and each machine in the farm has a same version that have been tested. When a virtual machine needs to be upgraded, the VM on the machine may be deleted and replaced with the VM that is configured to run the desired service.

While upgrades to existing software are not optimal, some servers within the networks do utilize the traditional update procedure of an in-place upgrade. For example, Active Directory Domain Controllers are upgraded by updating the current software on the server without completely replacing an image on the machine. The cloud manager may also be upgraded in place in some instances.

Figure 2:
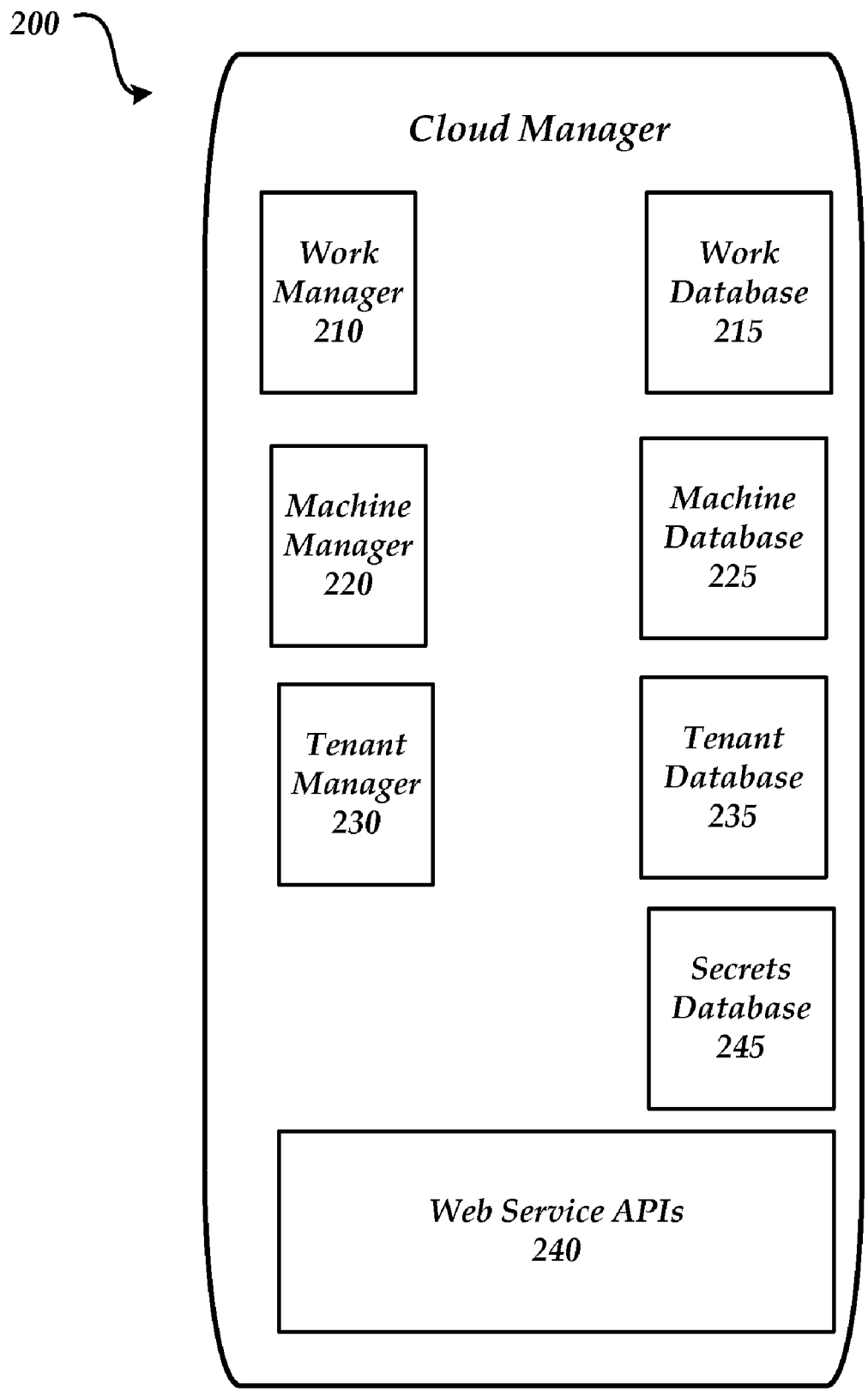
FIG. 2 shows a cloud manager including managers and associated databases.

FIG. 2 shows a cloud manager including managers and associated databases. As illustrated, cloud manager 200 comprises work manager 210, work database 215, machine manager 220, machine database 225, tenant manager 230, tenant database 235, secrets database 245 and web service APIs 240.

Generally, databases used within a cloud management system (e.g. system 100) are sized to enable high performance. For example, a database (such as work database 215, machine database 225, tenant database 235 and secrets database 245) may not exceed a predefined size limit (e.g. 30 GB, 50 GB, 100 GB, and the like). According to an embodiment, a database is sized such that it is small enough to fit in-memory of a physical machine. This assists in high read I/O performance. The size of the database may also be selected based on performance with an application program, such as interactions with a SQL server. The databases used in the farms may also be sized to enable high performance. For example, they may be sized to fit in-memory of the host machine and/or sized such that backup operations, move operations, copy operations, restore operations are generally performed within a predetermined period of time.

Cloud manager 200 divides the cloud manager data into four databases. The work database 215 for the work manager. The machine database 225 for the machine manager 220. The tenant database 235 for the tenant manager 230 and a secrets database 245 for storing sensitive information such as system account and password information, credentials, certificates, and the like. The databases may be on the same server and or split across servers. According to an embodiment, each database is mirrored for high availability and is a SQL database.

Cloud manager 200 is configured to interact with the databases using a reduced set of SQL features in order to assist in providing availability of the cloud manager 200 during upgrades of the databases. For example, foreign keys or stored procedures are attempted to be avoided. Foreign keys can make schema changes difficult and cause unanticipated failure conditions. Stored procedures place more of the application in the database itself Communications with the SQL servers are attempted to be minimized since roundtrips can be expensive compared to the cost of the underlying operation. For example, its usually much more efficient if all of the current SQL server interactions to a single database are wrapped in a single round-trip.

Constraints are rarely used within the databases (215, 225, 235). Generally, constraints are useful when it helps provide simple updates with the right kind of error handing without extra queries. For example, the fully qualified domain name (FQDN) table has a constraint placed on the "name" to assist in preventing a tenant from accidentally trying to claim the same FQDN as is already allocated to a different tenant.

Caution is used when adding indices. Indices typically improve read performance at the cost of extra I/Os for write operations. Since the data within the databases is primarily RAM resident, even full table scans are relatively fast. According to an embodiment, indices may be added once the query patterns have stabilized and a performance improvement may be determined by proposed indices. According to an embodiment, if adding the index will potentially take a long time the "ONLINE=ON" option may be specified such that the table isn't locked while the index is initially built.

According to an embodiment, upgrades to databases within the cloud manager may be performed without causing downtime to the cloud manager system. In other words, even during an upgrade of the cloud manager, the cloud manager continues processing received requests. As such, changes made to the schema are to be compatible with the previous schema. The SQL schema upgrade is run before the web servers used by the cloud manager are upgraded. When the web servers are upgraded they can start to use the new features enabled in the database. Database upgrades are limited such that operations involved in the upgrade are quick and efficient. For example, tables may be added and new nullable columns may be added to existing columns. New columns may be added at the end of a table. Generally, time consuming operations to the databases are avoided. For example, adding a default value to a newly added column at creation time may be a very time consuming operation when there is a large amount of data. Adding a nullable column, however, is a very quick operation. As discussed above, adding new indices are allowed, but caution should be taken when adding a new constraint to help ensure sure that the schema upgrade won't break with the existing data. For example, when a constraint is added it may be set to a state that is not checked and avoids a costly validation of existing rows and potential errors. Old tables and unused columns are removed after a new version is being used and the cloud manager is not accessing those tables and columns.

Generally, a single row in each of the databases is used to indicate a task and/or a desired state. For example, the tenant database 235 includes a single row for each tenant. A given tenant may include a Required Version record. This record is used to help ensure that the tenant is placed on a farm running the required version. For example, for tenant 1 to stay on SharePoint 14 SP1, the required version for tenant could be set to "14.1." and any version including 14.1 would match and any other versions (e.g. 14.2.xxxx) would not match. The tenant records may include other items such as authorized number of users, quotas (e.g. allowed total data usage, per user data usage, etc.), time restrictions, and the like. Some organization might have multiple tenants that represent different geographies, organizations or capabilities. According to an embodiment, tenants are walled off from each other without explicit invitation of the users (via extranet or other features).

According to one embodiment, each tenant is locked into a specific network. Tenants are kept localized to a small set of databases. A tenant is either small (smaller than would fill one database) in which case it is in exactly one database, shared with other tenants. This implies that all the tenants sharing that database need to upgrade at the same time. When a tenant grows larger it may be moved to its own dedicated database(s) and now might have more than one, but is not sharing databases with other tenants. Maintaining a large tenant in one or more dedicated databases helps in reducing a number of databases that are needed to be upgraded simultaneously in a single upgrade.

Similarly, the work database 215 includes a single row for each job. The machine database 225 may include a row for each physical machine, VM, farm, and the like. For example, machine manager database 225 may include a version string. According to an embodiment, each VHD, Farm, and VM within a network has an associated version string.

According to one embodiment, the cloud manager includes a simple logging system that may be configured to record a log entry for each web service call. A logging system may be implemented that includes as few/many features as desired. Generally, the logging system is used for measuring usage and performance profiling.

According to an embodiment, the Web Service APIs 240 are built using SOAP with ASP.net. The various Web Methods in the APIs follow two main patterns—Gets and Updates. Generally, the update methods take a data structure as the input and return the same structure as the output. The output structure returns the current state of the underlying object in the database, potentially differing from the input object if validation or other business logic changed some properties or else with additional properties filled in (for example record IDs or other values calculated by the cloud manager). The update methods are used for initial object creation as well as subsequent updates. In other words, callers to the web service APIs 240 can simply request the configuration they want and they don't need to keep track of whether the object already exists or not. In addition this means that updates are idempotent in that the same update call can be made twice with the identical effect to making it only once. According to an embodiment, an update method may include a LastUpdated property. When the LastUpdated property is present, the cloud manager 200 rejects the Update if the value of LastUpdate does not match the one currently stored in the database. Some Update methods include properties that are set on the first invocation of the method and are not set on other invocations of the method.

Cloud manager 200 is configured to avoid the use of callbacks. Since callbacks may be unreliable, clients interacting with cloud manager 200 may check object status using a web service API when they want to check a status of an update. According to an embodiment, a call to an update method causes cloud manager 200 to set the state of the underlying object to "Provisioning" and when the updates are completed the state is set to "Active".

Figure 3:
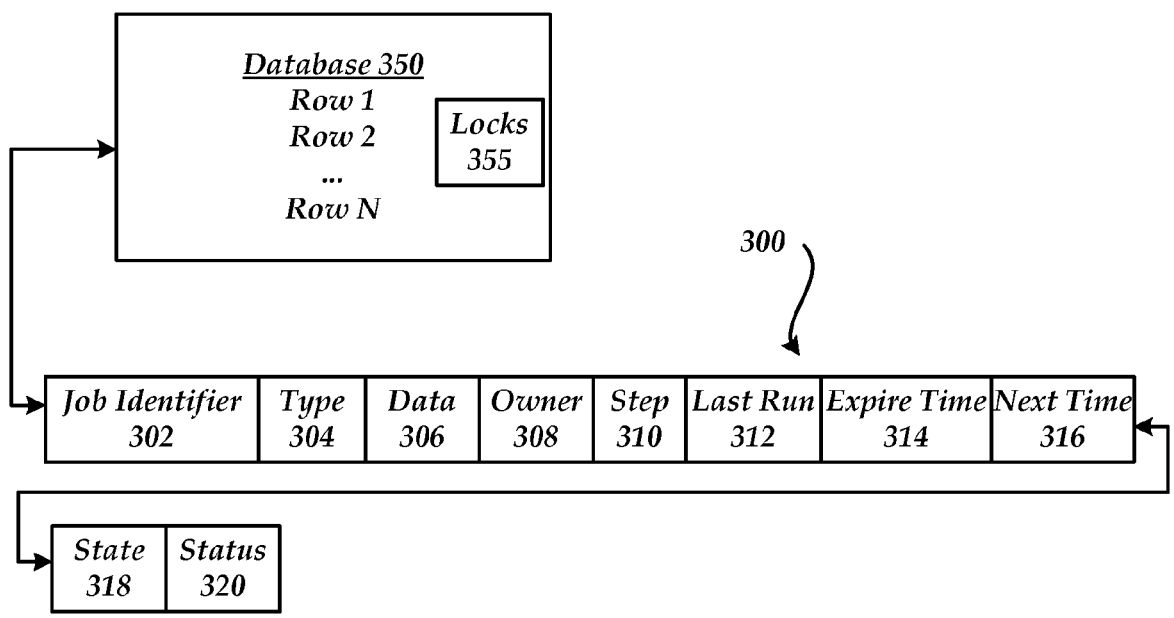
FIG. 3 shows an exemplary job record stored within a row of a database.

FIG. 3 shows an exemplary job record stored within a row of a database. As illustrated, record 300 comprises job identifier 302, type 304, data 306, owner 308, step 310, last run 312, expire time 314, next time 316, state 318 and status 320.

Generally, for each task that is requested to be performed, the cloud manager creates a record in database 350 (e.g. work database 215 in FIG. 2).

Job identifier 302 is used to specify a unique identifier for the requested task.

Type 304 specifies the task to perform. For example, the type may include a name of the script to be executed. For example, when the task is to run the script named "DeployVM.ps1" then the data 306 may include the identifier (e.g. "—VMID 123"). This allows new task types to be added to the system without requiring any changes to compiled or other binary parts of the system.

Data 306 is used to store data that is associated with the task. For example, the data may be set to the tenant, machine, network, VM, etc. on which the task is to be performed. The data 306 may also store one or more values to which a value in a database is set. The process running the task may look to the job record to see what value the desired number of machines is set to. The script uses the value in the database to perform the operation.

Owner 308 specifies a process/machine that is executing the process. For example, when a cloud manager machine starts execution of a job, the machine updates the owner 308 portion of the record with an ID of the machine.

Step 310 provides an indication of a step of the current script. For example, the script may divide a task into any number of steps. As the process completes a step of the script, step 310 is updated. A process may also look at step 310 to determine what step to execute in the script and to avoid having to re-execute previously completed steps.

Last run 312 provides a time the script was last started. Each time a script is started, the last run time is updated.

Expire time 314 is a time that indicates when the process should be terminated. According to an embodiment, the expire time is a predetermined amount of time (e.g. five minutes, ten minutes . . . ) after the process is started. The expire time may be updated by a requesting process through the web service API.

Next time 316 is a time that indicates when a task should next be executed. For example, a process may be stopped after completion of a step and be instructed to wait until the specified next time 316 to resume processing.

State 318 indicates a current state and Status 320 indicates a status of a job (e.g. Created, Suspended, Resumed, Executing, Deleted).

Duplicate rows in the database can be removed before they are performed if they have the same task type and data values. For example, multiple requests may be made to perform the same task that are stored in multiple rows of the database.

A job can have one or more locks 355 associated with it. If locks are not available then a job will not be scheduled to run until the locks are available. The locks may be configured in many different ways. For example, the locks may be based on a mutex, a semaphore, and the like. Generally, a mutex prevents code from being executed concurrently by more than one thread and a semaphore restricts a number of simultaneous uses of a shared resource up to a maximum number. According to an embodiment, a lock is a character string that represents a resource. The resource may be any type of resource. For example, the lock may be a farm, a machine, a tenant, and the like. Generally, the locks are used to defer execution of one or more tasks. Each job may specify one or more locks that it needs before running. A job may release a lock at any time during its operation. When there is a lock, the job is not scheduled. A job needing more than one lock requests all locks required at once. For example, a job already in possession of a lock may not request additional locks. Such a scheme assists in preventing possible deadlock situations caused by circular lock dependencies amongst multiple jobs.

Figure 4:
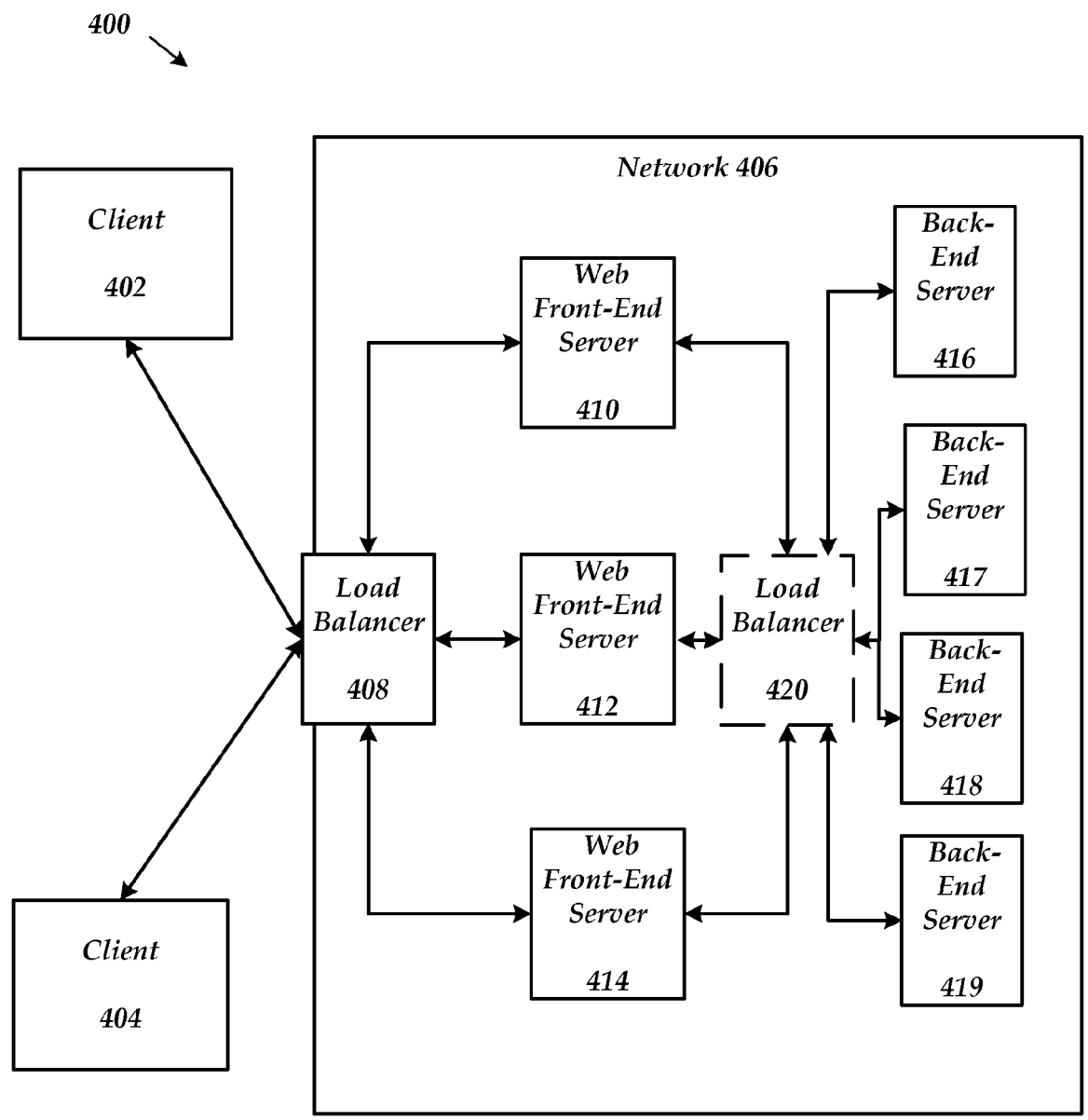
FIG. 4 shows an example system for a network including front-end and back-end servers for an online service.

FIG. 4 shows an example system 400 for a network including front-end and back-end servers for an online service. The example system 400 includes clients 402 and 404, network 406, load balancer 408, WFE servers 410, 412, 414 and back-end servers 416-419. Greater or fewer clients, WFEs, back-end servers, load balancers and networks can be used. Additionally, some of the functionality provided by the components in system 400 may be performed by other components. For example, some load balancing may be performed in the WFEs.

In example embodiments, clients 402 and 404 are computing devices, such as desktop computers, laptop computers, terminal computers, personal data assistants, or cellular telephone devices. Clients 402 and 404 can include input/output devices, a central processing unit ("CPU"), a data storage device, and a network device. In the present application, the terms client and client computer are used interchangeably.

WFEs 410, 412 and 414 are accessible to clients 402 and 404 via load balancer 408 through network 406. As discussed, the servers may be configured in farms. Back-end server 416 is accessible to WFEs 410, 412 and 414. Load balancer 408 is a dedicated network device and/or one or more server computers. Load balancer 408, 420, WFEs 410, 412 and 414 and back-end server 416 can include input/output devices, a central processing unit ("CPU"), a data storage device, and a network device. In example embodiments, network 406 is the Internet and clients 402 and 404 can access WFEs 410, 412 and 414 and resources connected to WFEs 410, 412 and 414 remotely.

In an example embodiment, system 400 is an online, browser-based document collaboration system. An example of an online, browser-based document collaboration system is Microsoft Sharepoint® from Microsoft Corporation of Redmond, Wash. In system 400, one or more of the back-end servers 416-419 are SQL servers, for example SQL Server from Microsoft Corporation of Redmond, Washington.

WFEs 410, 412 and 414 provide an interface between clients 402 and 404 and back-end servers 416-419. The load balancers 408, 420 direct requests from clients 402 and 404 to WFEs 410, 412 and 414 and from WFEs to back-end servers 416-419. The load balancer 408 uses factors such as WFE utilization, the number of connections to a WFE and overall WFE performance to determine which WFE server receives a client request. Similarly, the load balancer 420 uses factors such as back-end server utilization, the number of connections to a server and overall performance to determine which back-end server receives a request.

An example of a client request may be to access a document stored on one of the back-end servers, to edit a document stored on a back-end server (e.g. 416-419) or to store a document on back-end server. When load balancer 408 receives a client request over network 406, load balancer 408 determines which one of WFE server 410, 412 and 414 receives the client request. Similarly, load balancer 420 determines which one of the back-end servers 416-419 receive a request from the WFE servers. The back-end servers may be configured to store data for one or more tenants (i.e. customer).

Figure 5:
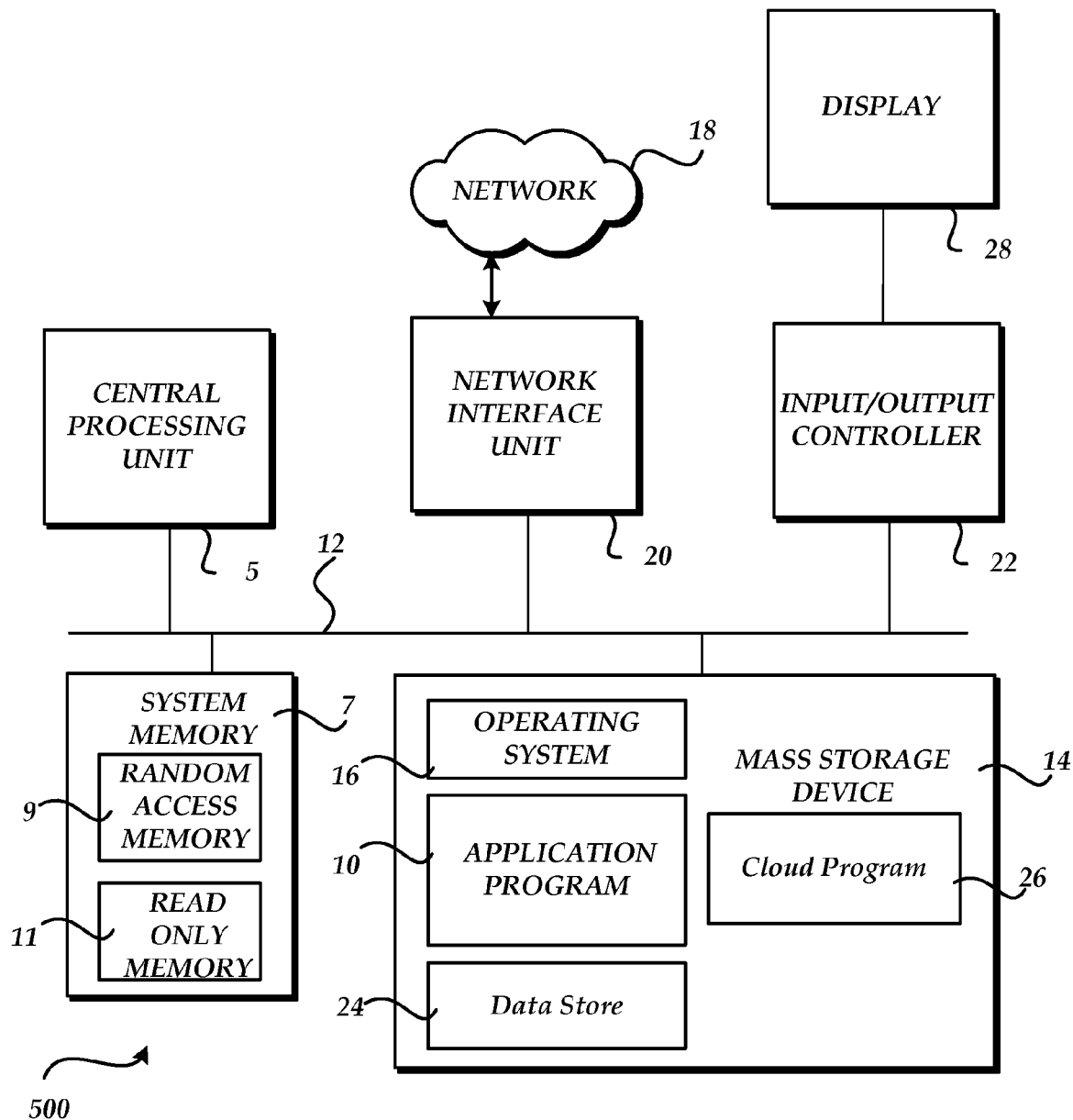
FIG. 5 illustrates a computer architecture for a computer.

Referring now to FIG. 5, an illustrative computer architecture for a computer 500 utilized in the various embodiments will be described. The computer architecture shown in FIG. 5 may be configured as a server, a desktop or mobile computer and includes a central processing unit 5 ("CPU"), a system memory 7, including a random access memory 9 ("RAM") and a read-only memory ("ROM") 11, and a system bus 12 that couples the memory to the central processing unit ("CPU") 5.

A basic input/output system containing the basic routines that help to transfer information between elements within the computer, such as during startup, is stored in the ROM 11. The computer 500 further includes a mass storage device 14 for storing an operating system 16, application programs 10, data store 24, files, and a cloud program 26 relating to execution of and interaction with the cloud system 100.

The mass storage device 14 is connected to the CPU 5 through a mass storage controller (not shown) connected to the bus 12. The mass storage device 14 and its associated computer-readable media provide non-volatile storage for the computer 500. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 500.

According to various embodiments, computer 500 may operate in a networked environment using logical connections to remote computers through a network 18, such as the Internet. The computer 500 may connect to the network 18 through a network interface unit 20 connected to the bus 12. The network connection may be wireless and/or wired. The network interface unit 20 may also be utilized to connect to other types of networks and remote computer systems. The computer 500 may also include an input/output controller 22 for receiving and processing input from a number of other devices, including a keyboard, mouse, or electronic stylus (not shown in FIG. 5). Similarly, an input/output controller 22 may provide output to a display screen 28, a printer, or other type of output device.

As mentioned briefly above, a number of program modules and data files may be stored in the mass storage device 14 and RAM 9 of the computer 500, including an operating system 16 suitable for controlling the operation of a networked computer, such as the WINDOWS® operating systems from MICROSOFT® CORPORATION of Redmond, Wash. The mass storage device 14 and RAM 9 may also store one or more program modules. In particular, the mass storage device 14 and the RAM 9 may store one or more application programs, such as cloud program 26, that perform tasks relating to the cloud system.

Figure 6:
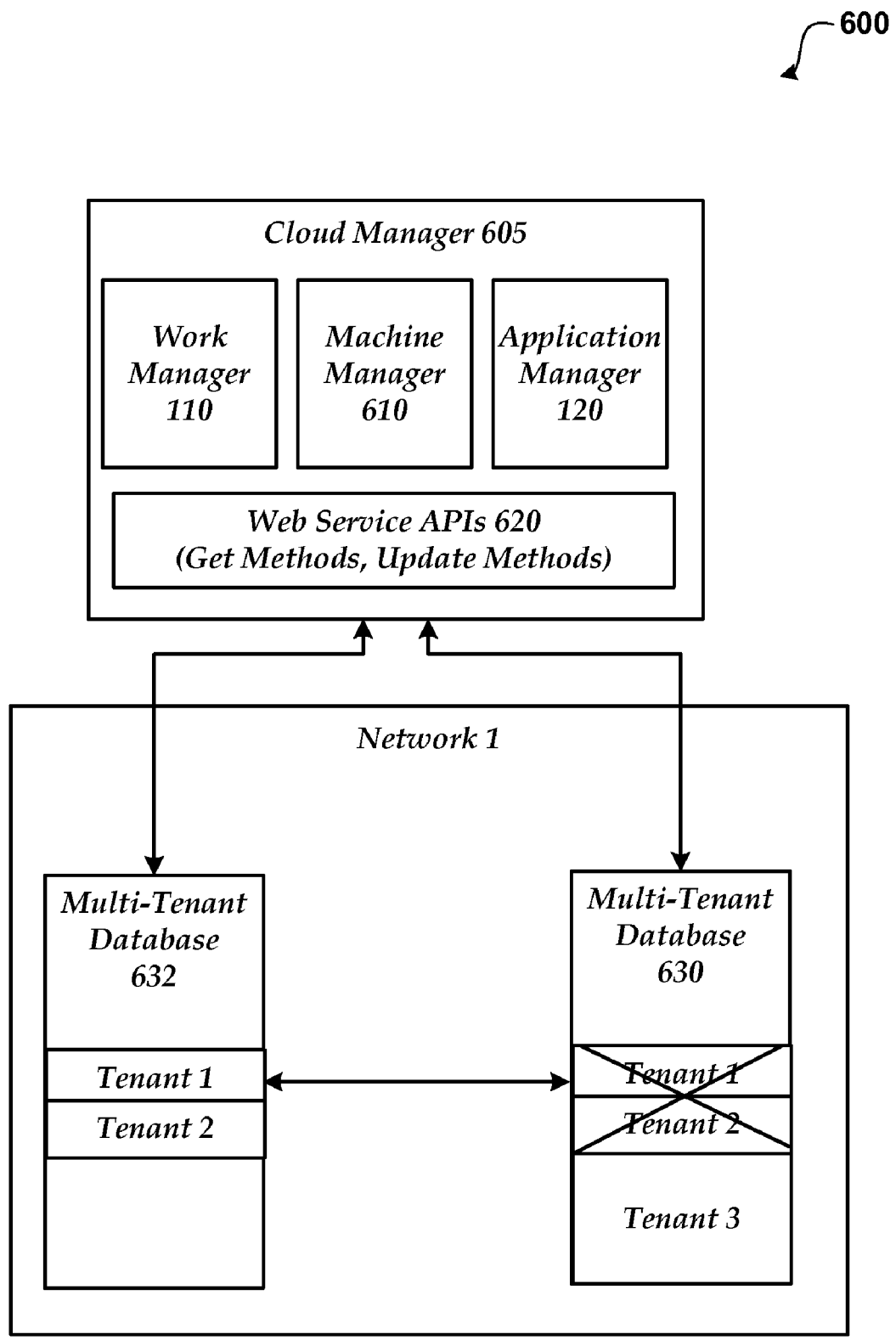
FIG. 6 shows a system for controlling and managing a splitting of a multi-tenant database.

FIG. 6 shows a system for controlling and managing a splitting of a multi-tenant database. As illustrated, system 600 shows a cloud manager 605 comprising work manager 110, machine manager 610, application manager 120, and web service APIs 620. Machine manager 610 is used to split multi-tenant databases that are located within the networks of the online service. While only one network is shown, many more networks are generally managed (e.g. ten, one hundred, one thousand, ten thousand, and the like). Cloud manager 605 operates and is configured similarly to the cloud manager system shown and described above. According to an embodiment, machine manager 610 is configured to manage machines in an online content collaboration service, such as a SHAREPOINT ONLINE service. Machine manager 610 may be used to manage machines for other online services.

Machine manager 610 understands the physical topology of the networks and keeps track of the location of the physical machines and virtual machines which are members within each of the networks. Machine manager 610 knows a location of each rack within the networks and each machine and the database(s) that is/are located within the rack. Machine manager 610 also keeps track of the specific versions of software that is being used on each of the machines as well as the Virtual Machine (VM) Images that are installed on each of the machines. Each VM image corresponds to a different server role.

Machine manager 610 may replace machines within a network, direct traffic to a new set of machines, databases, and/or perform some other actions in response to the management of the machines. For example, if one or more farms go down, machine manager 610 deploys a new farm and directs the traffic to the newly deployed farms.

An online service may experience significant changes in tenants. For example, during a trial period, a tenant may designate ten people to initially use the online service. The data storage requirements during this trial period for the tenant may be very small. After the trial period, however, the tenant may increase its use dramatically. For example, the tenant may go from ten users to ten thousand users thereby placing a much larger demand on the storage system. Other customers may also join or leave the online service. These scenarios can result in fragmented databases and/or databases that are growing beyond a specified limit.

Customer data may be stored in a dedicated database and/or in multi-tenant databases, such as multi-tenant database 630 and multi-tenant database 632. Some of the databases may be SQL databases. A multi-tenant database stores data from different tenants while enforcing control over access to each of the tenant's data.

When a database grows beyond a certain size, the efficiency of the operations on that database may be reduced. For example, a read/write operation may take longer when the database grows too large and/or becomes fragmented. According to an embodiment, the databases are sized such that the content from the database is stored completely within a memory of the machine that does not require disk access (e.g. 100 GB). A number of tenants in the database may also grow beyond a predefined limit. For example, a database may be limited to a certain number of tenants (i.e. one hundred, one thousand, ten thousand, and the like).

As can be seen, it may be desired to move content within a database to another database for many different reasons. When a determination is made to move content from one multi-tenant database to another, cloud manager 605 starts a splitting process of the database in which the content to split is currently located. A multi-tenant database (e.g. database 630) may be split to one or more other databases (e.g. database 632) while database 630 continues processing requests. For example, web servers within network 1 continue to request operations on database 630 while content is being split to database 632. All of the content from a database may also be split to two or more other databases.

After determining to split the database, a determination is made as to what content to split to the new database. The content to move may be determined in different manners. For example, the content may be divided by size, by tenant and/or a combination of both. According to an embodiment, the content is split such that the content to move is about equal to the content that remains on the database that is not being split. In the current example, a size of the content for tenant 1 and tenant 2 is about equal to the size of the content for tenant 3 in database 630. There may be any number of tenant's content that is moved. According to an embodiment, the smaller of the divided portion of the content is split. Referring to FIG. 6, it can be seen that the content from tenant 1 and tenant 2 is being split to database 632. The content for the content being split (i.e. tenant 1 and 2) may remain in the original database after being moved to the new database. This content may also be erased at a predetermined time, written over, or some other operation performed on the content.

After determining the content to split to the different database, cloud manager restricts the content being moved (tenant 1 and tenant 2 content) to read only operations in database 630. During the move of tenant 1's and 2's content, they each have read access to their content. Access to tenant's 3 content remains the same as before the split process is started. After moving the content to database 632, cloud manager 605 automatically redirects requests to database 632 for any request to the tenant content that was moved (i.e. tenant 1 and tenant 2). According to an embodiment, the content to move is relatively small since the database size is limited to a size that fits within a memory of the machine that is hosting the database. For example, a memory size may be 50, 100, 500 GB, and the like. When the memory size is 100 GB, the content that is being moved to the new database is generally less than 50 GB which can be moved to a new database quickly (e.g. a few minutes).

Cloud manager 605 may also split and/or move multi-tenant databases during other upgrade operations. For example, when a new farm is deployed within a network, the content from multi-tenant databases may be moved/split to the databases in the new farm. After new databases are storing the content that is split from another multi-tenant database, machine manager 610 automatically moves the traffic/load to the new database for the tenants residing in the new database and stops the traffic from going to the previous database storing the tenant's data.

Figure 7:
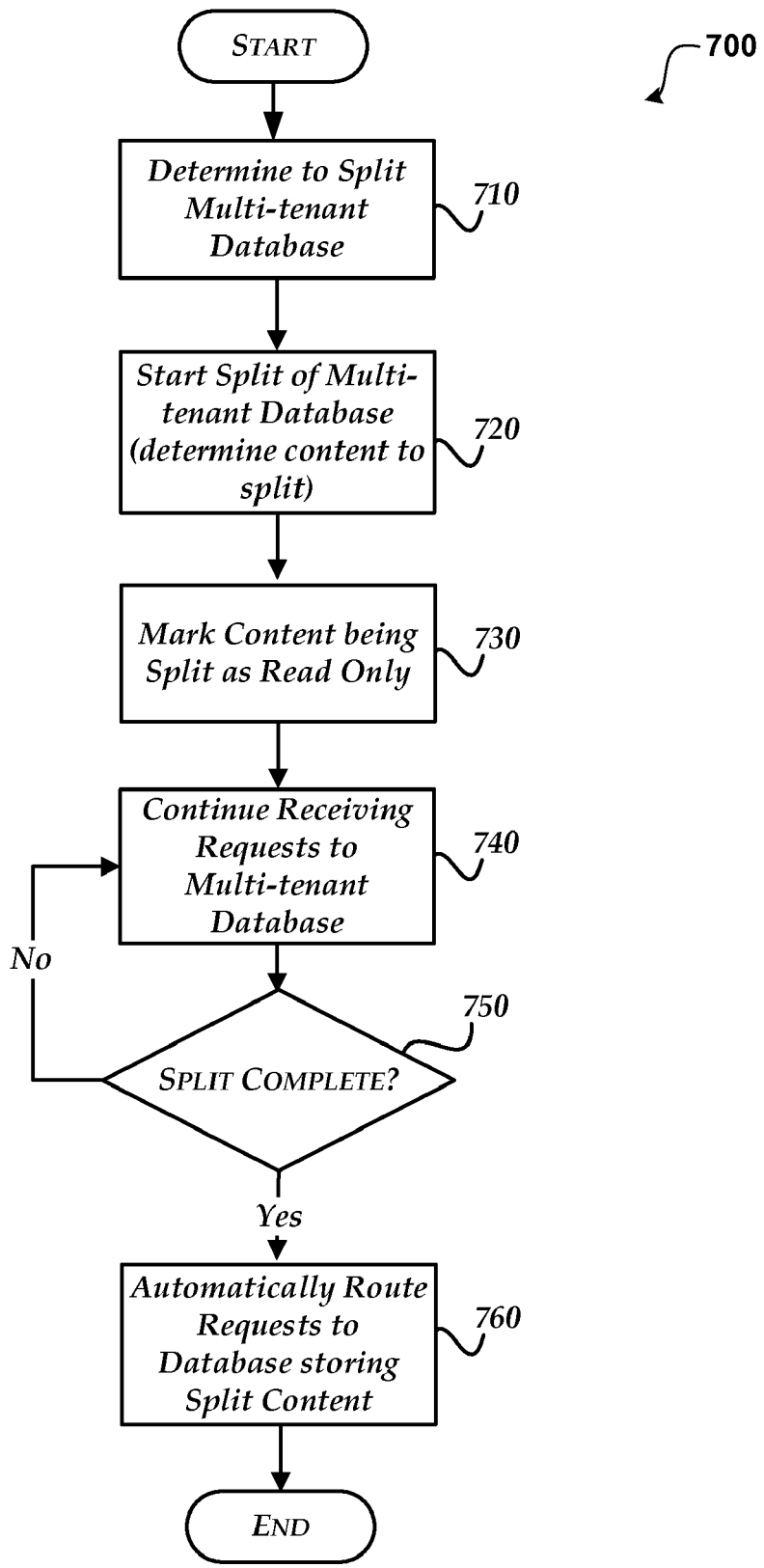
FIG. 7 show a process for splitting a multi-tenant database in an online service.

Referring now to FIG. 7, a process for splitting a multi-tenant database in an online service will be described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof Referring now to FIG. 7, after a start operation, the process 700 flows to operation 710, where a determination is made to split a multi-tenant database. The determination may occur in many different ways for many different reasons.

A request may be received through many different sources. For example, the request may be received through an API, such as a Web Service API, a command line interface, a graphical user interface, and the like.

The determination may also occur automatically. The determination may use factors that are associated with the database (e.g. size, fragmentation), tenants, online service requirements and the like. For example, a determination may be made to split a multi-tenant database when the size of the database grows too large and/or is expected to grow too large. A database may not yet exceed a predetermined size to trigger an automatic split, but some other factor (e.g. number of users that are associated grows beyond a certain number) may indicate that the database needs to be split. A database may also be split either automatically/manually when it becomes fragmented.

Moving to operation 720, the splitting of the multi-tenant database is started. Generally, the content from the multi-tenant database is split to remove one or more tenants from the database. The database may be split based on size of tenants, allocation to tenants, and the like. For example, when the content is split to divide the database, then the content is attempted to be split into equal portions. When the content is split to N number of other databases, then the content may be attempted to be split into N equal portions. According to an embodiment, the content is split according to the tenants content. For example, a first tenant may store 45 GB of content and five other tenants may store 46 GB of content. In this scenario, the first tenant's content would be split to the new database. The smaller portion of the content is generally chosen to be split in order to help reduce a time of the move of the content, performance on the system and read-only downtime. In some instances, a tenant may be allocated a different amount of space resulting in the content being split in different portions. For example, a small tenant may be allocated a 100 GB of content in which case that tenant may be split from the database and be moved to another database.

Flowing to operation 730, the content that is being split from the multi-tenant database is marked as read only. In this way, the content being split may still continue to be accessed by the tenant owning the split content. The other tenant's content that remains in the multi-tenant database continues to be accessible as if no operation was being performed on the database. In other words, only the tenant's content being split is read-only while the other tenants not being split remain writeable. Once the content to be split from the database is marked as read only, the content to split is moved to another database. Data shown to the user side by side with this data, but served by another backend system (for example, User Profile data, search data, taxonomy data, etc) are not affected.

Moving to operation 740, the database being split continues to receive requests for database operations. For example, the database may receive requests from the cloud manager, from the WFEs, or from some other requestor. Tenants being split out from a database obtain a lock such that new sites for the tenant are not provisioned until after the move has occurred.

Flowing to decision block 750, a determination is made as to whether the split of the multi-tenant database is complete. When the split is not complete, the splitting process returns to operation 740. When the splitting is complete, the process moves to operation 760.

Transitioning to operation 760, the incoming requests for the split content are automatically redirected to access the database that is now storing the split content. The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for splitting a multi-tenant database that is still being accessed in an online service, comprising:
   starting a splitting process of a database used in the online service to split a portion of content of the database to a different database; wherein the database that is being split is a multi-tenant database used to store data from different tenants and that continues to receive and process requests from web servers for database operations during the splitting process; wherein the multi-tenant database comprises two or more tenants including data that is stored within the multi-tenant database;
   determining split content to split from the database, wherein the split content is the portion of the content from the database that comprises content for a portion of the different tenants;
   marking the split content as read only during a move operation of the split content to the different database;
   while continuing to receive and process operations on the database, moving the split content to the different database; and
   upon completion of moving the split content, automatically redirecting requests for the split content to the different database.

2. The method of claim 1, wherein a size of the database is restricted to a size that fits within a memory of a physical machine that is hosting the database.

3. The method of claim 1, wherein the splitting process of the database occurs in response to a request to defragment the database.

4. The method of claim 1, wherein the splitting process of the database occurs in response to a number of tenants being stored in the database.

5. The method of claim 1, wherein the splitting process of the database occurs in response to a size of the content being stored within the database exceeding a predetermined size.

6. The method of claim 1, wherein determining the split content to move from the database to the different database, comprises dividing the database into approximately equal portions based on the tenants' content that is stored in the database and moving a smaller of the portions to the different database.

7. The method of claim 1, wherein the splitting process is started automatically in response to an upgrade operation of a farm in a network of the online service.

8. The method of claim 1, further comprising moving all of the content of the database to at least two different databases.

9. The method of claim 1, wherein the splitting process occurs during an upgrade of a SQL server.

10. A computer-readable storage medium, excluding signals, having computer-executable instructions for, comprising:
    starting a splitting process of a SQL database used in the online service to split content of the database to a different database; wherein the database that is being split is a multi-tenant database used to store data from different tenants that continues to receive and process requests for database operations during the splitting process;
    automatically determining split content to split from the database, wherein the split content is the portion of the content from the database that comprises content for a portion of the different tenants;
    marking the split content as read only during a move operation of the split content to the different database;
    while continuing to receive and process operations on the database, moving the split content to the different database; and
    upon completion of moving the split content, automatically redirecting requests for the split content to the different database.

11. The computer-readable storage medium of claim 10, wherein a size of the database is restricted to a size that fits within a memory of a physical machine that is hosting the database.

12. The computer-readable storage medium of claim 10, wherein the splitting process is performed to defragment the database.

13. The computer-readable storage medium of claim 10, wherein the splitting process of the database occurs in response to adding users to a tenant.

14. The computer-readable storage medium of claim 10, wherein the splitting process of the database occurs in response to a size of the content being stored within the database exceeding a predetermined size.

15. The computer-readable storage medium of claim 10, wherein determining the split content to move from the database to the different database, comprises dividing the database into approximately equal portions that is stored in the database and moving a smaller of the portions to the different database.

16. The computer-readable storage medium of claim 10, wherein the splitting process is started automatically in response to an upgrade operation of a farm in a network of the online service.

17. A system for splitting a multi-tenant database currently in use in an online service, comprising:
    a network comprising web servers, back-end servers and databases
    a processor and a computer-readable storage medium;

an operating environment stored on the computer-readable medium and executing on the processor; and a cloud manager operative to:

start a splitting process of a database used in the online service to split content of the database to a different database on a same network as the database;

the split content is the portion of the content from the database that comprises content for a portion of tenants;

wherein a size of the database fits within a memory of a web server that is hosting the database;

prevent write access the split content only during a move operation of the split content to the different database while allowing write access to the non-split content of the database;

while continuing to receive and process operations on the database, move the split content to the different database; and upon completion of moving the split content, automatically redirect requests for the split content to the different database.

18. The system of claim 17, wherein the splitting process is performed in response to at least one of: a request to defragment the database; a request to add more users to a tenant; a determination that a size of the content being stored within the database exceeds a predetermined size.

19. The system of claim 17, wherein determining the split content to move from the database to the different database, comprises dividing the database into approximately equal portions that is stored in the database and moving a smaller of the portions to the different database.

20. The system of claim 17, wherein the splitting process is started automatically in response to an upgrade operation of a farm in a network of the online service.

* * * * *